(12) United States Patent
Bostick et al.

(10) Patent No.: US 10,547,768 B2
(45) Date of Patent: Jan. 28, 2020

(54) PHYSICAL OBSTRUCTION CORRECTION BASED VIRTUAL DISPLAY GENERATION

(71) Applicant: INTERNATIONAL BUSINESS MACHINES CORPORATION, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 68 days.

(21) Appl. No.: 15/970,949

(22) Filed: May 4, 2018

(65) Prior Publication Data

US 2019/0342471 A1  Nov. 7, 2019

(51) Int. Cl.
*G06F 17/00* (2019.01)
*H04N 5/222* (2006.01)
(Continued)

(52) U.S. Cl.
CPC .......... *H04N 5/2224* (2013.01); *G03B 21/56* (2013.01); *G03H 1/0005* (2013.01);
(Continued)

(58) Field of Classification Search
CPC combination set(s) only.
See application file for complete search history.

(56) References Cited

U.S. PATENT DOCUMENTS 7,006,055 B2   2/2006  Sukthankar et al.
7,778,445 B2   8/2010  Au
(Continued)

FOREIGN PATENT DOCUMENTS

CN   101271657   9/2008
CN   203825849   9/2014
WO   2017145155  8/2017

OTHER PUBLICATIONS

Geng, Jason; Three-dimensional display technologies; Adv Opt Photonics; Dec. 17, 2014; 123 pages.
(Continued)

*Primary Examiner* — Howard D Brown, Jr.
(74) *Attorney, Agent, or Firm* — Schmeiser, Olsen & Watts; James Nock

(57) ABSTRACT

A method and system for improving virtual display generation with respect to a visual obstruction is provided. The method includes generating code associated with determining and resolving a physical obstruction with respect to a visual presentation. Video retrieval devices are enabled for retrieving a first video stream of a first object and a second object being viewed by users and a second video stream of the users. A visual obstruction including a portion of the first object visually obstructing a portion of the second object is detected. A boundary and content type associated with the portion of the second object being visually obstructed is determined and and analyzed with respect to a threshold value and a resulting video stream presenting an entire view of the second object without being visually obstructed with respect to the first object is generated and presented.

20 Claims, 9 Drawing Sheets

(51) Int. Cl.
  *H04N 5/272* (2006.01)
  *H04N 5/262* (2006.01)
  *G03B 21/56* (2006.01)
  *G03H 1/00* (2006.01)
(52) U.S. Cl.
  CPC ......... *H04N 5/2228* (2013.01); *H04N 5/2624* (2013.01); *H04N 5/272* (2013.01); *G03H 2210/20* (2013.01)

(56) References Cited

U.S. PATENT DOCUMENTS

| | | | |
|---|---|---|---|
| 8,639,032 B1* | 1/2014 | Voorhees | G09B 5/02 |
| | | | 382/176 |
| 8,761,582 B2* | 6/2014 | Kasuya | G11B 27/034 |
| | | | 386/281 |
| 9,183,605 B2 | 11/2015 | Matsuoka et al. | |
| 9,762,855 B2 | 9/2017 | Browne et al. | |
| 10,386,634 B2* | 8/2019 | Ekambaram | G02B 27/0101 |
| 2014/0105563 A1 | 4/2014 | Voorhees et al. | |
| 2015/0279222 A1* | 10/2015 | Tian | G09B 7/02 |
| | | | 434/351 |
| 2017/0199377 A1* | 7/2017 | Ekambaram | G02B 27/0101 |
| 2019/0130648 A1* | 5/2019 | Duca | G06T 19/006 |

OTHER PUBLICATIONS

Wikipedia; Holography; https://en.wikipedia.org/wiki/Holography; last edited Apr. 27, 2018; 24 pages.
Windows Mixed Reality Developer Forum; Adjusting Holographic Content Transparency; https://forums.hololens.com/discussion/1300/adjusting-holographic-content-transparency; retrieved from the Internet Dec. 27, 2016; 3 pages.

* cited by examiner

PHYSICAL OBSTRUCTION CORRECTION BASED VIRTUAL DISPLAY GENERATION

FIELD

The present invention relates generally to a method for generating a virtual display and in particular to a method and associated system for improving virtual display technology associated with generating multiple video streams for preventing visual obstruction with respect to visual presentations.

BACKGROUND

Accurately presenting visual presentations typically includes an inaccurate process with little flexibility. Controlling and modifying virtual presentations associated with visual impairments may include a complicated process that may be time consuming and require a large amount of resources. Accordingly, there exists a need in the art to overcome at least some of the deficiencies and limitations described herein above.

SUMMARY

A first aspect of the invention provides a virtual display generation improvement method comprising: generating, by a processor of a hardware device, configuration code associated with determining and resolving a physical obstruction with respect to a visual presentation; enabling, by the processor executing the configuration code, a first video retrieval device for retrieving a first video stream of an first object and a second object being viewed by a plurality of users; enabling, by the processor executing the configuration code, a second video retrieval device for retrieving a second video stream of the plurality of users; detecting, by the processor executing the configuration code with respect to the first video stream and the second video stream, a visual obstruction comprising a portion of the first object visually obstructing a portion of the second object with respect to at least one viewing angle of the plurality of users; determining in real time, by the processor executing the configuration code, a time period associated with the portion of the first object visually obstructing the portion of the second object with respect to the at least one viewing angle; determining, by the processor executing the configuration code, a boundary associated with the portion of the second object being visually obstructed with respect to the at least one viewing angle; determining, by the processor executing the configuration code, a content type of the portion of the second object being visually obstructed with respect to the at least one viewing angle; analyzing, by the processor executing the configuration code, the time period, the boundary, and the content type with respect to a severity threshold value; generating, by the processor executing the configuration code with respect to results of the analyzing, a video stream presenting an entire view of the second object without being visually obstructed with respect to the first object and the at least one viewing angle; and presenting, by the processor, the video stream.

A second aspect of the invention provides a computer program product, comprising a computer readable hardware storage device storing a computer readable program code, the computer readable program code comprising an algorithm that when executed by a processor of a hardware device implements a virtual display generation improvement method, the method comprising: generating, by the processor, configuration code associated with determining and resolving a physical obstruction with respect to a visual presentation; enabling, by the processor executing the configuration code, a first video retrieval device for retrieving a first video stream of an first object and a second object being viewed by a plurality of users; enabling, by the processor executing the configuration code, a second video retrieval device for retrieving a second video stream of the plurality of users; detecting, by the processor executing the configuration code with respect to the first video stream and the second video stream, a visual obstruction comprising a portion of the first object visually obstructing a portion of the second object with respect to at least one viewing angle of the plurality of users; determining in real time, by the processor executing the configuration code, a time period associated with the portion of the first object visually obstructing the portion of the second object with respect to the at least one viewing angle; determining, by the processor executing the configuration code, a boundary associated with the portion of the second object being visually obstructed with respect to the at least one viewing angle; determining, by the processor executing the configuration code, a content type of the portion of the second object being visually obstructed with respect to the at least one viewing angle; analyzing, by the processor executing the configuration code, the time period, the boundary, and the content type with respect to a severity threshold value; generating, by the processor executing the configuration code with respect to results of the analyzing, a video stream presenting an entire view of the second object without being visually obstructed with respect to the first object and the at least one viewing angle; and presenting, by the processor, the video stream.

A third aspect of the invention provides a hardware device comprising a processor coupled to a computer-readable memory unit, the memory unit comprising instructions that when executed by the processor implements a virtual display generation improvement method comprising: generating, by the processor, configuration code associated with determining and resolving a physical obstruction with respect to a visual presentation; enabling, by the processor executing the configuration code, a first video retrieval device for retrieving a first video stream of an first object and a second object being viewed by a plurality of users; enabling, by the processor executing the configuration code, a second video retrieval device for retrieving a second video stream of the plurality of users; detecting, by the processor executing the configuration code with respect to the first video stream and the second video stream, a visual obstruction comprising a portion of the first object visually obstructing a portion of the second object with respect to at least one viewing angle of the plurality of users; determining in real time, by the processor executing the configuration code, a time period associated with the portion of the first object visually obstructing the portion of the second object with respect to the at least one viewing angle; determining, by the processor executing the configuration code, a boundary associated with the portion of the second object being visually obstructed with respect to the at least one viewing angle; determining, by the processor executing the configuration code, a content type of the portion of the second object being visually obstructed with respect to the at least one viewing angle; analyzing, by the processor executing the configuration code, the time period, the boundary, and the content type with respect to a severity threshold value; generating, by the processor executing the configuration code with respect to results of the analyzing, a video stream presenting an entire view of the second object without being visually obstructed with respect to the first object and the at least one viewing angle; and presenting, by the processor, the video stream.

The present invention advantageously provides a simple method and associated system capable of accurately presenting visual presentations.

DETAILED DESCRIPTION

Figure 1:
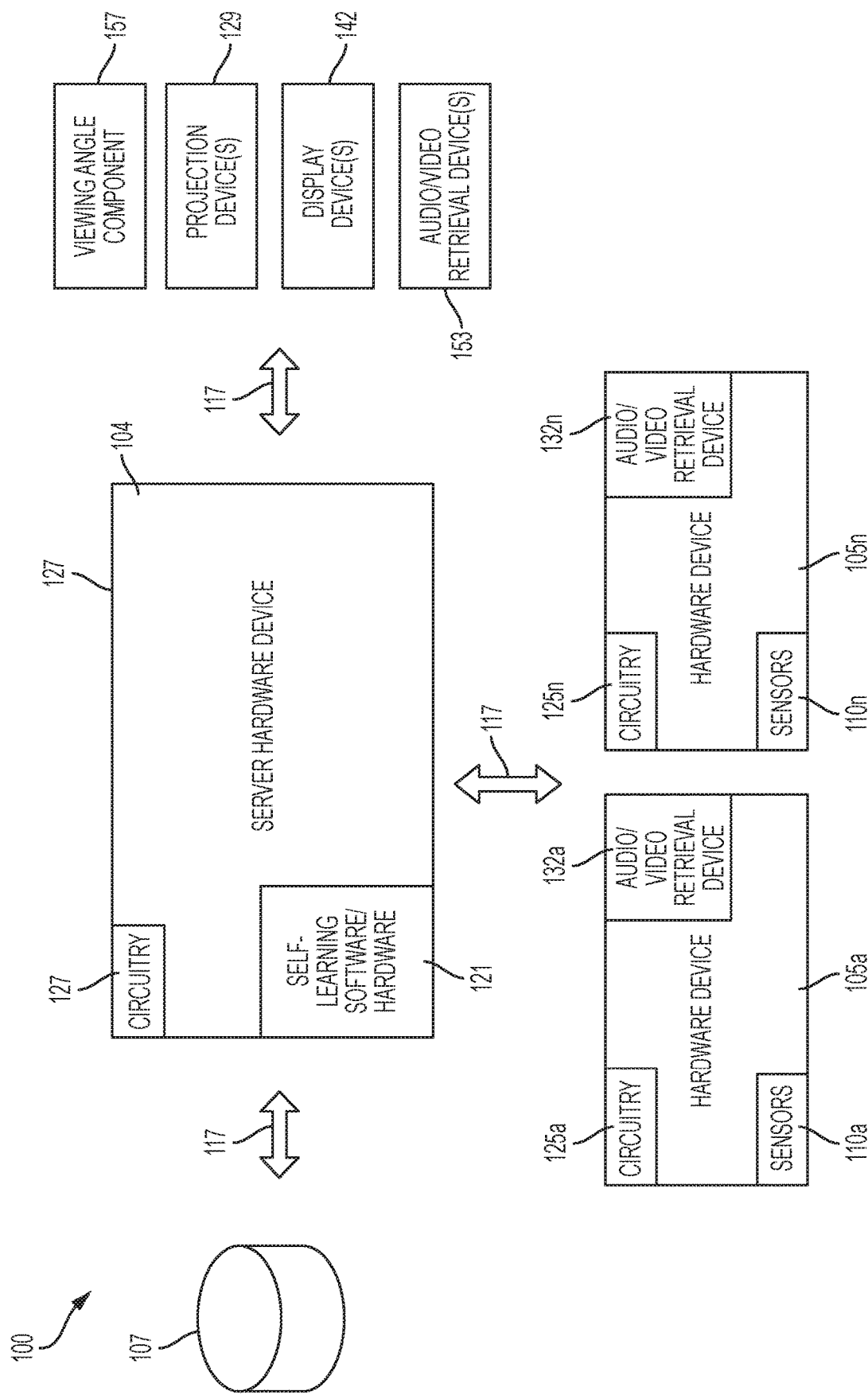
FIG. 1 illustrates a system for improving virtual display technology associated with generating multiple video streams for preventing a visual obstruction with respect to visual presentations, in accordance with embodiments of the present invention.

FIG. 1 illustrates a system 100 for improving virtual display technology associated with generating multiple video streams for preventing visual obstruction with respect to visual presentations, in accordance with embodiments of the present invention. System 100 enables a server hardware device 104 in combination with hardware devices 105a . . . 105n for detecting the presence of a physical (visual) obstruction blocking a display area (e.g., from users view the display area) containing content during a presentation. Additionally, system 100 is enabled for:
1. Predicting a timeframe associated with the obstruction blocking the display area.
2. Defining a boundary associated with the obstructed area of content.
3. Generating a virtual display comprising unobstructed view of the obstructed content via analysis of the predicted timeframe and the defined boundary of the obstructed area of content.

System 100 enables a process for detecting a presence of a physical obstruction blocking portions of content from different viewing angles of users. The following three examples illustrate solutions for generating a virtual display comprising an unobstructed view of the obstructed content for live and video recorded presentation sessions:

Example 1

System 100 projects (in real time or with respect to recorded video) obstructed whiteboard content on a hologram projected virtual surface presented in front of the physical obstruction. For example, a holographic projector (e.g., one of projection devices 129) is enabled to project a virtual wall (comprising a same dimension of a defined boundary of the obstructed area of content) in front of the physical obstruction. Alternatively, a holographic projector is enabled to project a virtual wall with curved or multisided surface to allow users in wide room to have clear viewing angle of the obstructed content. A Pico projector (e.g., one of projection devices 129) is enabled to project retrieved digital data associated with the obstructed whiteboard content onto the virtual surface of the holographic projection. The virtual display projects an overlay over the physical obstruction such that a student may view unobstructed content.

Example 2

System 100 projects (in real time or with respect to recorded video) a split screen view of unobstructed whiteboard content on a first screen of the split screen and a presenter (e.g., an instructor) on a second screen of the split screen. Therefore, a virtual desktop may be split into two separate windows including an instructor video/audio window and an unobstructed content window from the whiteboard.

Example 3

System 100 projects (in real time or with respect to recorded video) an overlay view of whiteboard content obstructed in a video stream. For example, a virtual display may be presented via the students/classroom device (e.g., one of hardware devices 105a . . . 105n) with an overlay view of obstructed whiteboard content. The obstructed content from the electronic whiteboard may be overlaid into a boundary area of the video content being obstructed.

Additionally, system 100 enables a contextual analysis process for determining and predicting a length of time and significance of the obstruction to determine if a virtual view of the obstructed content is required.

System 100 enables the following example process associated with server hardware device 104 and hardware devices 105a . . . 105n for detecting and resolving visual obstructions in a classroom environment.

The classroom environment includes cameras for detecting viewing obstructions with respect to viewing angles. Additionally, the classroom environment includes video cameras for capturing live or video stream lectures, a hologram projector for overlaying a virtual wall in front of an obstruction with respect to a dimension of the obstructed content, and a Pico projector for projecting digital content (associated with the obstructed content) on the virtual wall. The process includes initiating a video capture of a classroom lecture associated with presenting electronic whiteboard content. In response to detecting a physical (visual)

obstruction and associated viewing angle (with respect to the audience), system 100 enables a process for predicting a duration of a specified viewing angle obstruction. System 100 executes contextual analysis code for identifying a number of people (of the audience) being impacted by the specified viewing angle obstruction for the predicted duration. For example, an identified obstruction is predicted to comprise a long duration (e.g., an instructor is describing a complex topic) or a short duration. Additionally, a boundary of the obstructed area of content is determined. In response, system 100 generates a virtual display comprising an unobstructed view of the content with respect to a live and/or video recorded session as follows: System 100 projects obstructed whiteboard content on hologram projected virtual surface in front of the physical obstruction, system 100 projects split screen view of unobstructed whiteboard content and separate instructor window, or system 100 projects an overlay view of whiteboard content obstructed in video. The aforementioned process results in students being presented with an unobstructed view of content on a virtual display for a live or video recorded session.

System 100 includes a camera comprising specialized software for identifying a number of people impacted by a visual obstruction with respect to different viewing angles associated with specified threshold values defined as a quantity or percentage. A contextual analysis process may be performed based on a type of content being obstructed and a topic being presented by an instructor with respect to associated historical content. For example, a video associated with a previous semester recording comprising a same topic may be analyzed to determine how long an instructor previously obstructed portions of associated content. Additionally, a contextual analysis process may be executed with respect to movement and a direction of the physical object to predict how long the content may be obstructed. For example, an instructor is moving around or walking side to side (e.g., content obstructed for short time with breaks to allow students to see and take notes) and an associated obstruction duration prediction is determined. A pattern of obstruction for a given instruction may be learned via software code. For example, an instructor A writes a problem on a board for 1 or 2 minutes and explains and moves around to allow students to see the problem from different viewing angles for note taking. Likewise, an instructor B writes and talks and therefore the obstruction is more constant. A pattern for each professor may be learned and therefore a method and timing of when to render content on a virtual display with respect to obstructed content may differ for each professor.

System 100 of FIG. 1 includes a server hardware device 104 (i.e., specialized hardware device), hardware devices 105*a* . . . 105*n* (i.e., specialized hardware device), a database (repository) 107 (e.g., a cloud based system for storing, inter alia, whiteboard content, classroom session video data, etc.) projection devices 129, display devices 142, and audio/video retrieval devices 153 interconnected through a network 117. Additionally, system 100 may comprise a viewing angle component 157 enabled allowing a camera to detect a viewing angle of viewer and presenters of visual content and determine and define boundary areas of presentation content (e.g., on a white board) being obstructed. Server database system 104 includes specialized circuitry 127 (that may include specialized software and self-learning software code/hardware structure 121 (i.e., including self-learning software code). Hardware devices 105*a* . . . 105*n* may include personal devices provided to each individual. Hardware devices 105*a* . . . 105*n* may be Bluetooth enabled to provide connectivity to technical support systems. Hardware devices 105*a* . . . 105*n* include specialized circuitry 125*a* . . . 125*n* (that may include specialized software), audio/video retrieval devices 132*a* . . . 132*n*, and sensors 110*a* . . . 110*n*. Sensors 110*a* . . . 110*n* may include any type of internal or external sensor (or biometric sensor) including, inter alia, a heart rate monitor, a blood pressure monitor, a temperature sensor, a pulse rate monitor, an ultrasonic sensor, an optical sensor, a video retrieval device, an audio retrieval device, humidity sensors, etc. Server hardware device 104, hardware devices 105*a* . . . 105*n*, and database 107 may each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, server hardware device 104, hardware devices 105 . . . 105*n*, and database 107 may each comprise a specialized hardware device comprising specialized (non-generic) hardware and circuitry (i.e., specialized discrete non-generic analog, digital, and logic based circuitry) for (independently or in combination) executing a process described with respect to FIGS. 1-6. The specialized discrete non-generic analog, digital, and logic based circuitry may include proprietary specially designed components (e.g., a specialized integrated circuit, such as for example an Application Specific Integrated Circuit (ASIC) designed for only implementing an automated process for improving virtual display technology associated with generating multiple video streams for preventing visual obstruction with respect to visual presentations. Projection device(s) 129 may comprise any type of video presentation device including, inter alia, a virtual surface and hologram projection device, a split screen graphical user interface (GUI) projection device, an overlay GUI projection device, a Pico projector, an electronic whiteboard to capture notes written by a teacher/instructor, etc. A hologram projection device may be configured to project a virtual wall or surface in front of a visual obstruction with respect to dimensions of an obstructed area. A Pico projector may be configured project digital content on the virtual wall or surface such that a view may view obstructed content. Display device(s) 142 may comprise any type of display device including, inter alia, a virtual surface and hologram display device, a split screen graphical user interface (GUI) display device, an overlay GUI display device, etc. Audio/video retrieval device(s) 153 may include, inter alia, video cameras, microphones, speakers, etc. Audio/video retrieval device(s) 153 are configured to detect and viewing areas and associated viewing angles associated with object being visually obstructed with respect to a plurality of viewers. Network 117 may include any type of network including, inter alia, a local area network, (LAN), a wide area network (WAN), the Internet, a wireless network, etc. Alternatively, network 117 may include an application programming interface (API).

Figure 2:
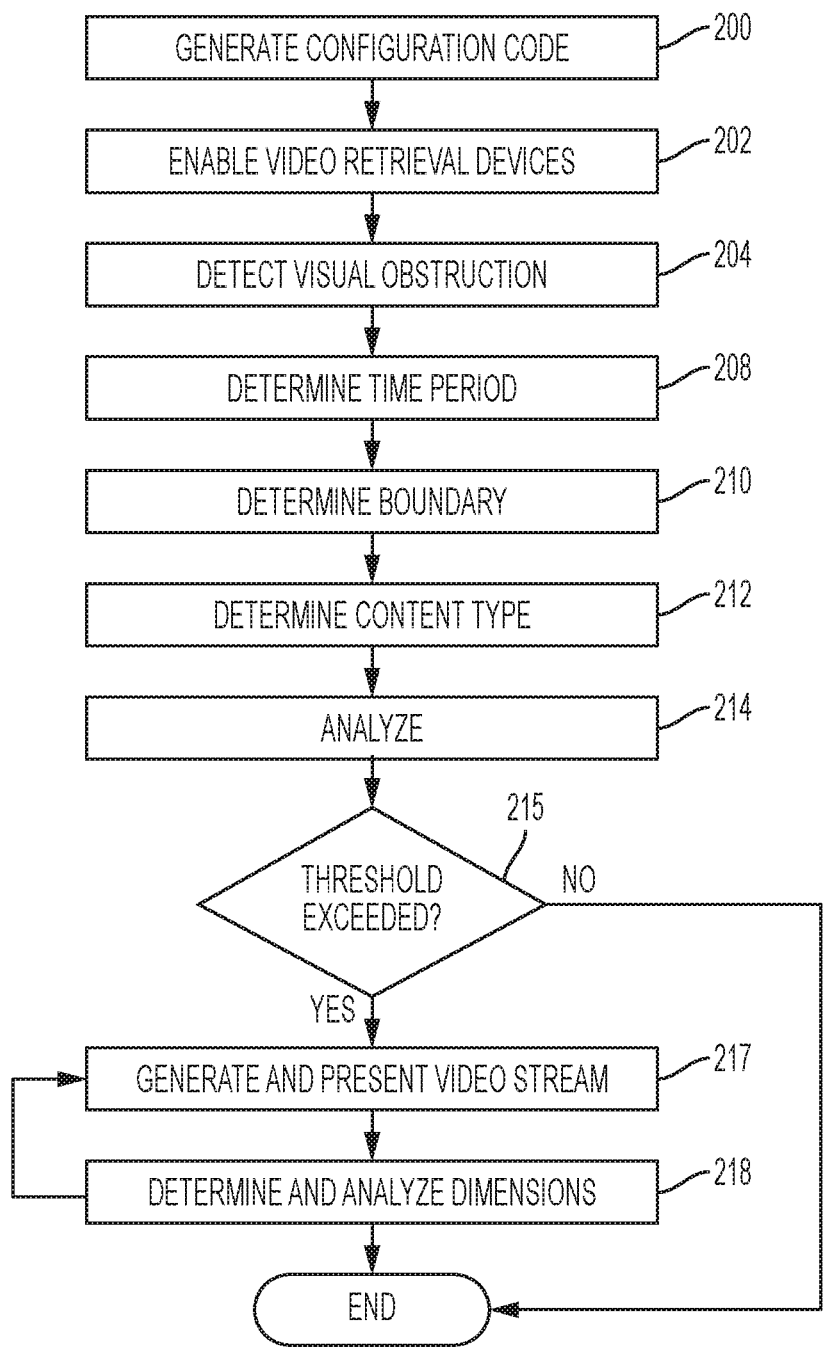
FIG. 2 illustrates an algorithm detailing a process flow enabled by the system of FIG. 1 for improving virtual display technology associated with generating multiple video streams for preventing a visual obstruction with respect to visual presentations, in accordance with embodiments of the present invention.

FIG. 2 illustrates an algorithm detailing a process flow enabled by system 100 of FIG. 1 for improving virtual display technology associated with generating multiple video streams for preventing visual obstruction with respect to visual presentations, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by server hardware device 104 and hardware devices 105a . . . 105n. In step 200, configuration code associated with determining and resolving a physical obstruction with respect to a visual presentation is generated. Generating the configuration code may include: defining a duration of obstruction threshold; defining a percentage of content obstruction threshold; defining a content type importance level; defining a number of viewers threshold; and generating severity threshold value based on the aforementioned defined values. The severity threshold value is incorporated into the configuration code. As a first alternative, generating the configuration code may include: generating a display means for presenting a video stream; generating display code for enabling the display means; and incorporating the display code within the configuration code. As a second alternative, generating the configuration code may include: retrieving (from a database) and analyzing video data associated with previous physical obstructions with respect to previous visual presentations; generating obstruction prediction code based on results of the analysis; and incorporating the obstruction prediction code within the configuration code.

In step 202, a first video retrieval device and a second video retrieval device are enabled (via execution of the configuration code) such that a first video stream and a second video stream are retrieved. The first video stream includes a first object and a second object being viewed by users. The second video stream includes video of the users. In step 204, a visual obstruction is detected via execution of the configuration code with respect to the first video stream and the second video stream. The visual obstruction includes a portion of the first object visually obstructing a portion of the second object with respect to at least one viewing angle of the users. In step 208, a time period is determined in real time. The time period is associated with the portion of the first object visually obstructing the portion of the second object with respect to the at least one viewing angle. In step 210, a boundary is determined. The boundary is associated with the portion of the second object being visually obstructed with respect to the at least one viewing angle. In step 212, a content type of the portion of the second object being visually obstructed with respect to the at least one viewing angle is determined. In step 214, the time period, the boundary, and the content type are analyzed with respect to an obstruction severity threshold value. In step 215, it is determined if the obstruction severity threshold value is exceeded. If in step 215 it is determined that the obstruction severity threshold value is not exceeded, then the process is terminated and the presentation continues as is. If in step 215 it is determined that the obstruction severity threshold value is exceeded, then in step 217 a video stream is generated based on results of the analysis of step 214. The video stream presents an entire view of the second object without being visually obstructed with respect to the first object and the at least one viewing angle. Generating the video stream may include generating a hologram associated with the video stream. The video stream is presented to users. The video stream may be presented by projecting the hologram in front of the visual obstruction thereby generating a virtual surface for the projection. The virtual surface may include a single flat virtual surface, a single curved virtual surface, a multi-sided projected virtual surface, etc. A view of the first object and the second object may be blocked from the users by the visual surface. As a first alternative, generating the video stream may include generating a split screen view including a first video stream portion (of the video stream) comprising the first object and a second video stream portion (of the video stream) comprising the second object. The first object comprises an instructor presenting on a surface structure comprised by the second object. The split screen view may be presented via a display device. As a second alternative, generating the video stream may include generating an overlay view comprising the portion of the second object being obstructed overlaying and the portion of the first object.

In step 218, dimensions of an enclosure surrounding the users and the visual presentation are determined via a plurality of sensors. The dimensions are analyzed with respect to the at least one viewing angle and step 217 is repeated for presenting the video stream to the users based on results of the analysis with respect to the at least one viewing angle.

Figure 3:
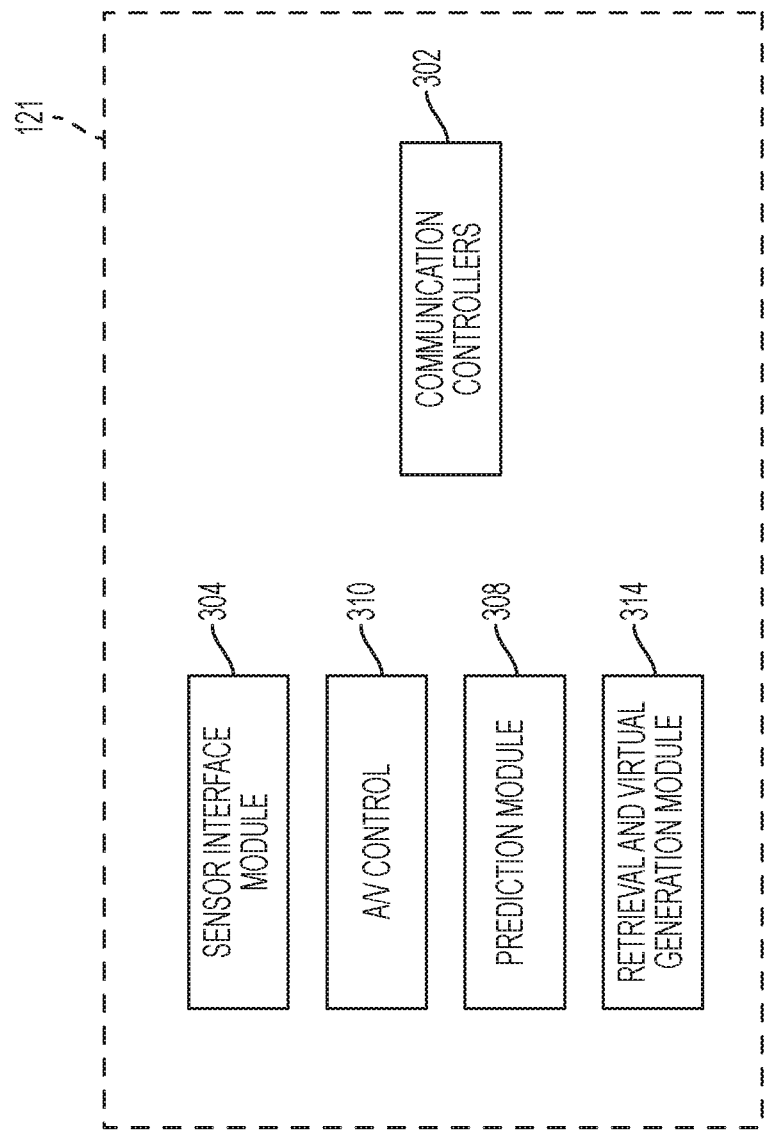
FIG. 3 illustrates an internal structural view of the self-learning software/hardware structure of FIG. 1, in accordance with embodiments of the present invention.

FIG. 3 illustrates an internal structural view of self-learning software/hardware structure 121 of FIG. 1, in accordance with embodiments of the present invention. Self-learning software/hardware structure 121 includes a sensor interface module 304, an audio video control module 310, a prediction module 308, a retrieval and virtual display generation module 314, and communication controllers 302. Sensor interface module 304 comprises specialized hardware and software for controlling all functions related to sensors 110a . . . 110n of FIG. 1. Audio video control module 310b comprises specialized hardware and software for controlling all functionality related to an audio video retrieval device to detect a viewing angle of viewers and a position of a presenter. Prediction module 308 comprises specialized hardware and software for controlling all functions related to determining and predicting obstruction significance and associated duration. Retrieval and virtual display generation module 314 comprises specialized hardware and software for controlling all functions related to retrieving video content from a whiteboard content repository database and creating a virtual display comprising an unobstructed view. Communication controllers 302 are enabled for controlling all communications between sensor interface module 304, audio video control module 310, prediction module 308, and a retrieval and virtual display generation module 314.

Figure 4:
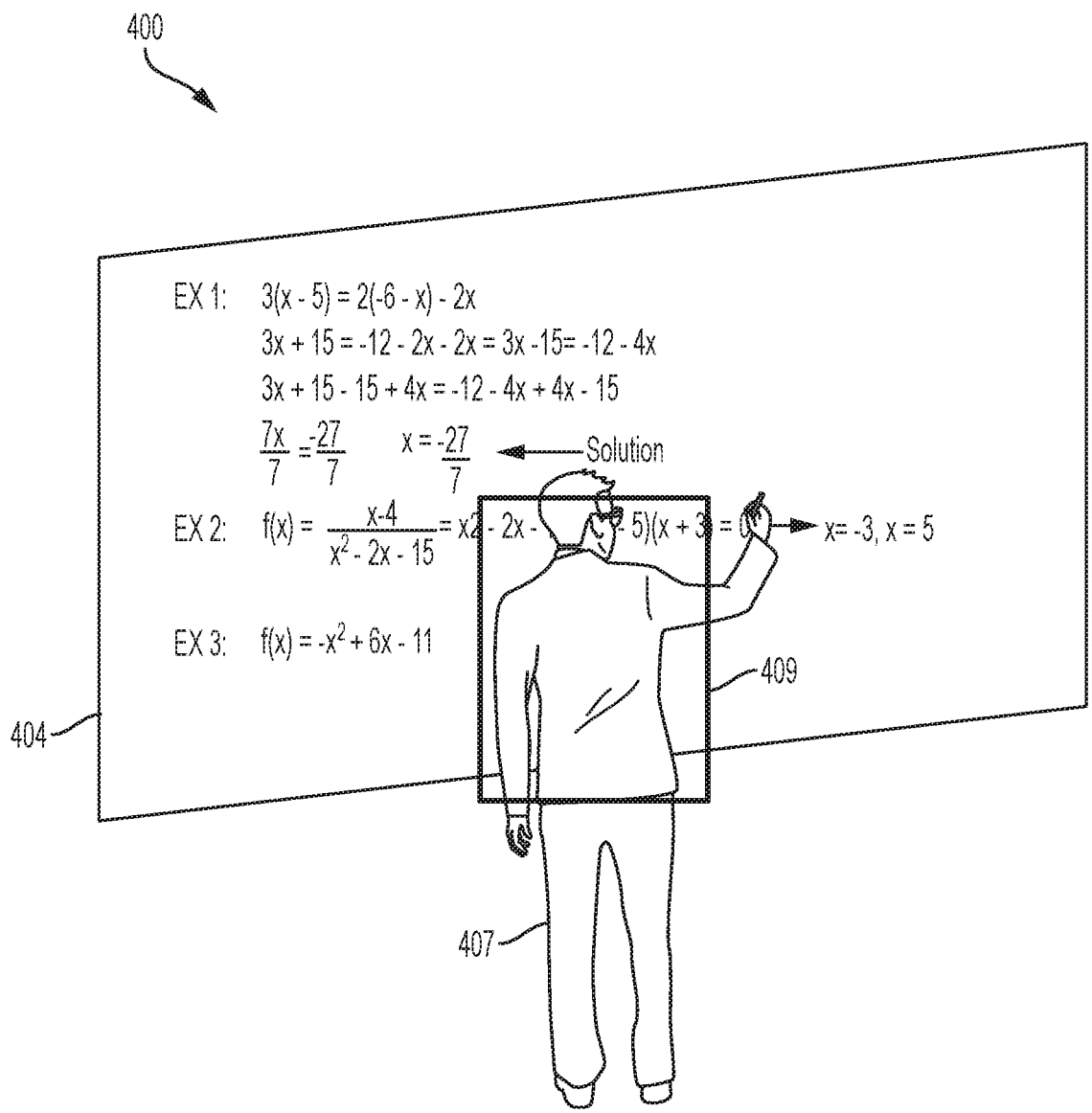
FIG. 4 illustrates an implementation example associated with an instructor partially obstructing a portion of a presentation board comprising information for student viewing, in accordance with embodiments of the present invention.

FIG. 4 illustrates an implementation example associated with an instructor 407 partially obstructing a portion 409 of a presentation board 404 comprising information for student viewing, in accordance with embodiments of the present invention. For example, in a classroom or lecture environment, a student view of presentation content may be partially obstructed when a teacher is writing on a white board (i.e., presentation board 404). The partial obstruction is dependent on a viewing angle of a student and an associated position of the teacher as the teacher is writing on the white board. Physical objects in the classroom could additionally obstruct a student view of the presentation content. Therefore, there is a need (in a classroom environment) to detect the presence of a physical object located between a display area and a viewer's position such that system 100 of FIG. 1 may generate a real time virtual display or recorded video that is rendered without a viewing obstruction to the content.

Figure 5:
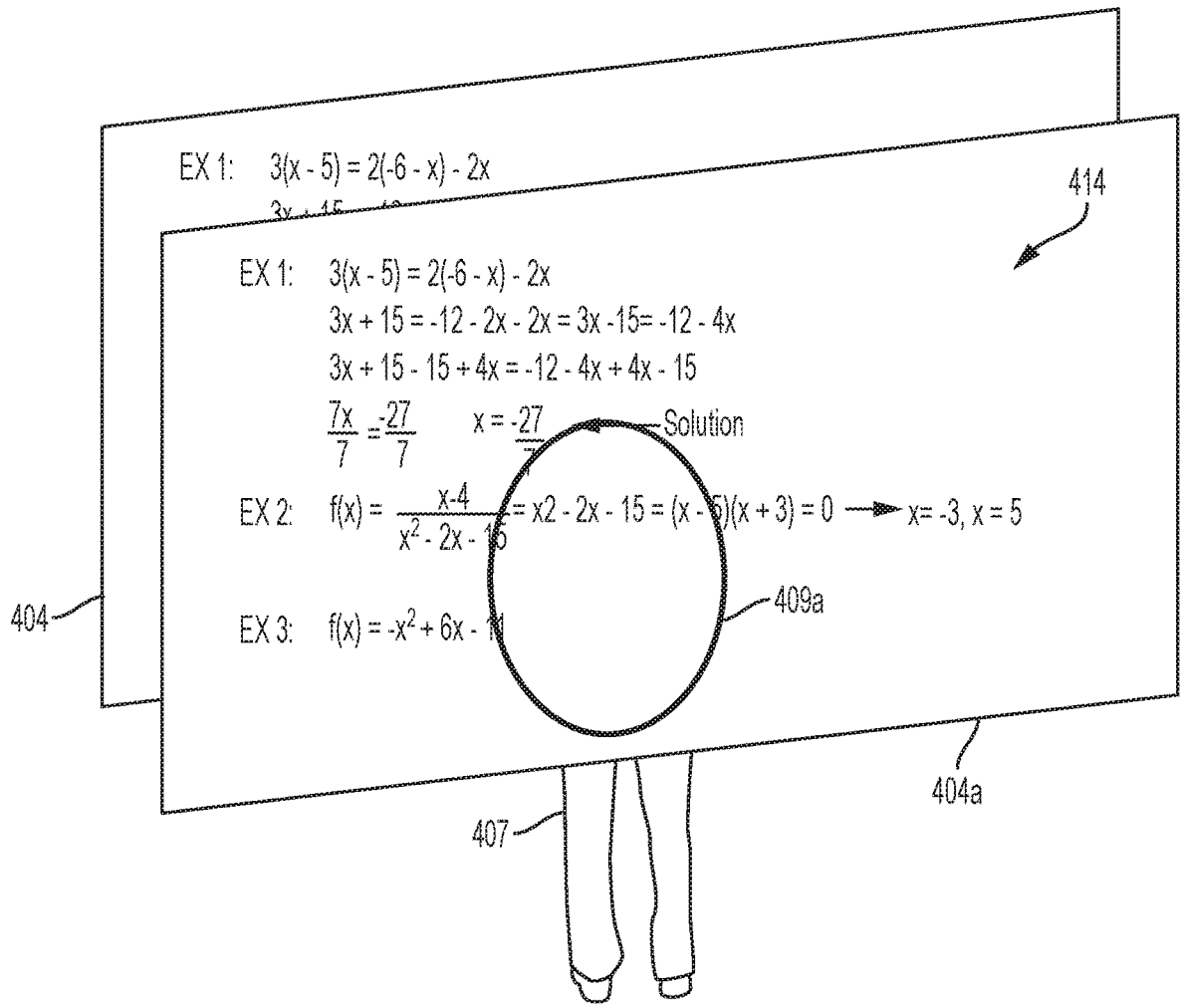
FIG. 5 illustrates an implementation example associated with resolving the partial obstruction illustrated in FIG. 4, in accordance with embodiments of the present invention.

FIG. 5 illustrates an implementation example associated with resolving the partial obstruction illustrated in FIG. 4, in accordance with embodiments of the present invention. The example illustrated in FIG. 5 depicts an instructor 407 writing on a white board and describing associated content to students without an obstructed view. During interaction with the white board (e.g., writing in the board), a significant relevant active portion of the content present on the board is not visible to the students (i.e., as illustrated with respect to FIG. 4) as the instructor's 407 position has created an obstacle to with respect to a student view of the significant relevant active portion of the content. Therefore, system 100 is enabled to generate and project a holographic surface 404*a* (replicating the whiteboard) between a position of the instructor 407 and students. Pico projectors are configured to project replicated digital content 414 (i.e., from the white board) on the holographic surface 404*a* thereby eliminating the obstacle with respect to the significant relevant active portion of the content.

Figure 6:
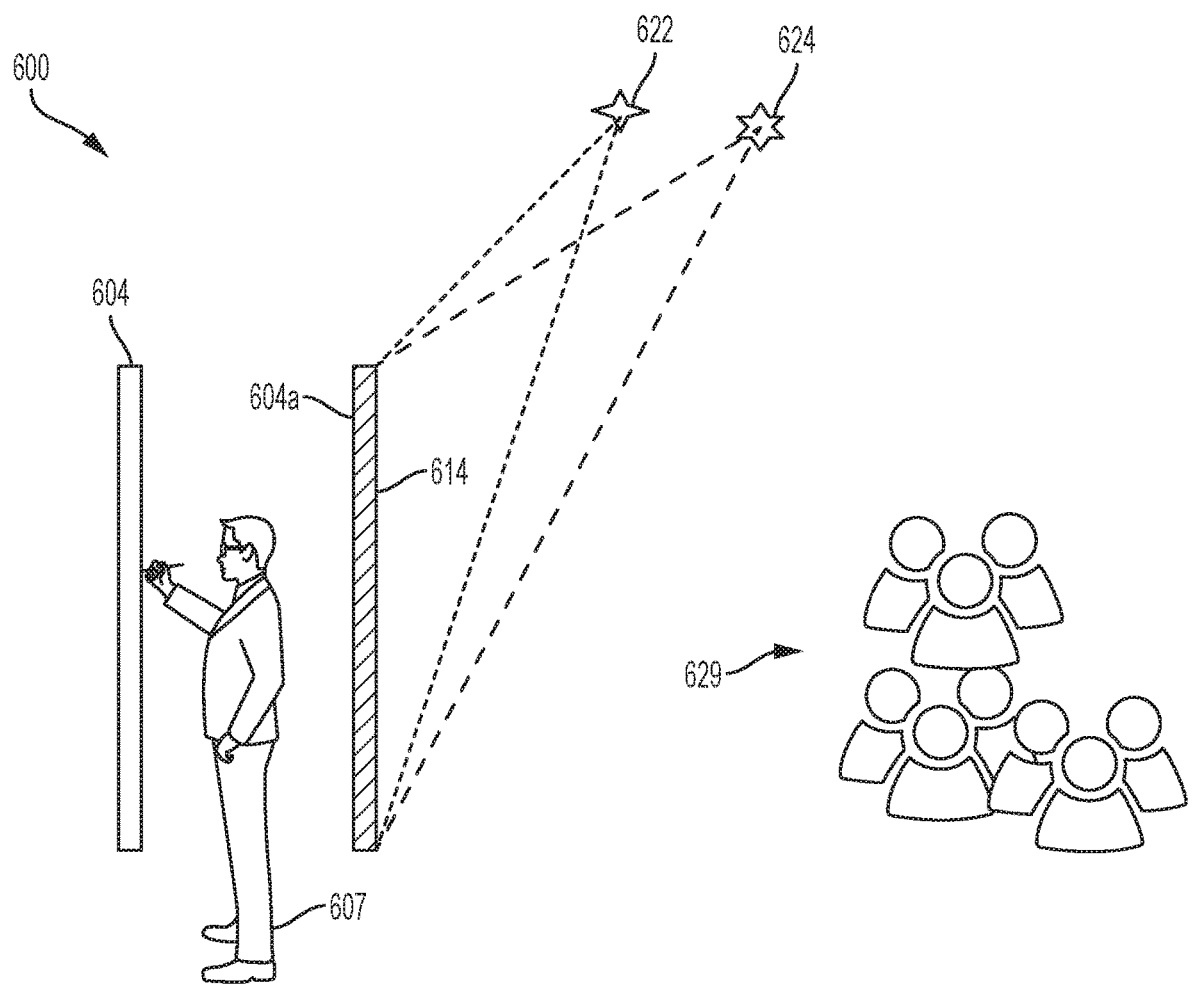
FIG. 6 illustrates an implementation example associated with a system for implementing the resolution illustrated in FIG. 5, in accordance with embodiments of the present invention.

FIG. 6 illustrates an implementation example associated with a system 600 for implementing the resolution illustrated in FIG. 5, in accordance with embodiments of the present invention. The example illustrated in FIG. 5 depicts side view of system 600 comprising holographic projectors 622 and Pico projectors 624. Holographic projectors 622 are configured for identifying a position of an obstacle and subsequently projecting a holographic surface 604*a* for content projection. Pico projectors 624 are configured for projecting digital content 614 on holographic surface 604*a* such that students 629 may can clearly view digital content 614. System 600 enables the following example process associated with detecting and resolving visual obstructions in a classroom environment:

System 600 executes a pre-configuration process that includes defining an obstruction threshold for executing an obstruction detection process. For example, an obstruction time period comprising seconds may not be associated with a significant obstruction for implementing a virtual display overlay process if the physical obstruction is determined to be moving (e.g., an instructor walking in front of a white board for 5 seconds). Additionally, access to historical video content is enabled. The historical content is used for enabling a self-learning process with respect to context and obstruction timeframes that could impact viewing of information. Likewise, a number of people impacted may be defined for categorizing a severity of an obstruction. For example, 1 person=low impact, 5=medium impact, and 10=high impact.

In response to completion of the pre-configuration process, system 600 initiates a video capture process for monitoring a classroom lecture with electronic whiteboard content. When a physical object obstructing content on the whiteboard is detected (e.g., via cameras placed facing the whiteboard in combination with specialized software), an obstruction resolution process is initiated. For example, an instructor is determined to be currently standing in front of content on a whiteboard thereby blocking a student view of the content with respect to different viewing angles. Additionally, differing viewing angles (e.g., from a side view) may be determined to allow the content to be visible from the differing viewing angles. Likewise, software of system 600 calculates a distance from the detected obstruction to the content viewing surface (i.e., the whiteboard). Additionally, the software calculates (based on retrieved sensor data) a portion of the content obstructed (with respect to all the content) by the physical object based on a detected viewing angle of the students. The software further calculates a width of the classroom and associated viewing angles of the students.

In response to completion of the video capture process, system 600 enables a process for predicting a time duration and action associated with the physical obstruction. For example, system 600 may be configured to render the obstructed content on a virtual display if the time duration exceeds a specified threshold time. Additionally, a contextual analysis process with respect to content and a historical record may be executed to predict a time duration and significance associated with the physical obstruction. For example, a camera with associated software may be enabled to identify a number of people impacted by the physical obstruction at the specific differing viewing angles. Alternatively, a contextual analysis process may be performed based on a type of content being obstructed and an associated topic with respect to historical content previously recorded. For example, a video recorded during a previous semester (i.e., for same topic) may be analyzed to determine how long the instructor previously obstructed the physical content. Likewise, a contextual analysis may be performed with respect to a movement and direction of the physical object to predict how long the content will be obstructed. For example, the instructor is determined to be moving around or walking side to side such that the content is obstructed for a short time with breaks allowing students to view the obstructed content. Additionally, a pattern of an obstruction for given instructional presentation may be learned. For example, an instructor A writes a problem on a white board for 1 or 2 minutes and subsequently explains the subject matter and moves around thereby allowing the students to view the content from different viewing angles for taking notes. Likewise, an instructor B, writes and talks simultaneously thereby causing the obstruction to be more constant. Each pattern for each professor is learned (via software) thereby determining a timing as to when to render content on virtual display with respect to differing instructors. An additional process for define a boundary of an obstructed area of content may be implemented. For example, the entire contents of an electronic whiteboard may be captured and stored in a repository thereby allowing a viewing angle of the content and the obstruction to be used to determine a boundary of the obstructed area of the content. In response, content (from the repository) associated with the obstructed boundary area is searched and retrieved and a virtual display comprising an unobstructed view of content for a live and video recorded session is presented via a hologram view, a split screen view, and/or an overlay view as described, supra. Virtually displaying obstructed content in each of aforementioned views provides a process for students (for live or video recorded sessions) to view previously obstructed content while an instructor is writing on a board and explaining the associated content.

Figure 7:
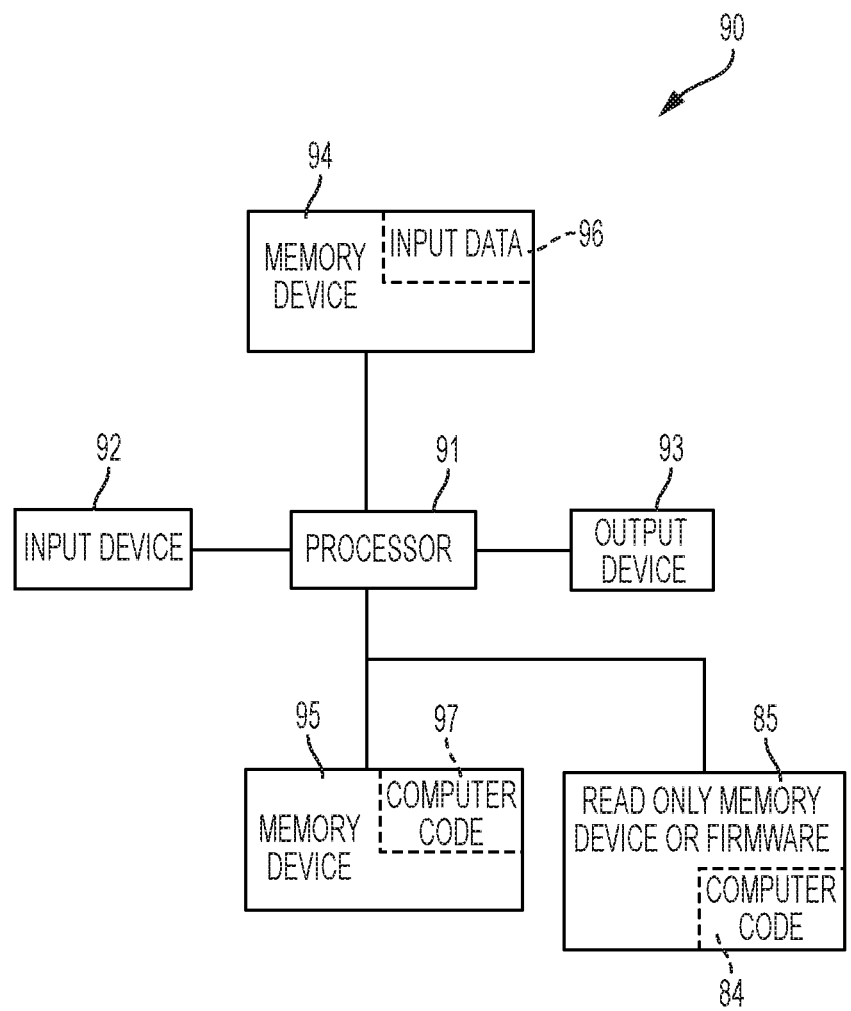
FIG. 7 illustrates a computer system used by the system of FIG. 1 for improving virtual display technology associated with generating multiple video streams for preventing a visual obstruction with respect to visual presentations, in accordance with embodiments of the present invention.

FIG. 7 illustrates a computer system 90 (e.g., hardware devices 105*a* . . . 105*n* and/or server hardware device 104 of FIG. 1) used by or comprised by the system of FIG. 1 for improving virtual display technology associated with generating multiple video streams for preventing a visual obstruction with respect to visual presentations, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 7 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random-access memory (DRAM), a read-only memory (ROM), etc. The memory device 95 includes a computer code 97. The computer code 97 includes algorithms (e.g., the algorithm of FIG. 2) for improving virtual display technology associated with generating multiple video streams for preventing a visual obstruction with respect to visual presentations. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve virtual display technology associated with generating multiple video streams for preventing a visual obstruction with respect to visual presentations. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving virtual display technology associated with generating multiple video streams for preventing visual obstruction with respect to visual presentations. In another embodiment, the invention provides a business method that performs the process steps of the invention on a subscription, advertising, and/or fee basis. That is, a service supplier, such as a Solution Integrator, could offer to enable a process for improving virtual display technology associated with generating multiple video streams for preventing a visual obstruction with respect to visual presentations. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 7 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
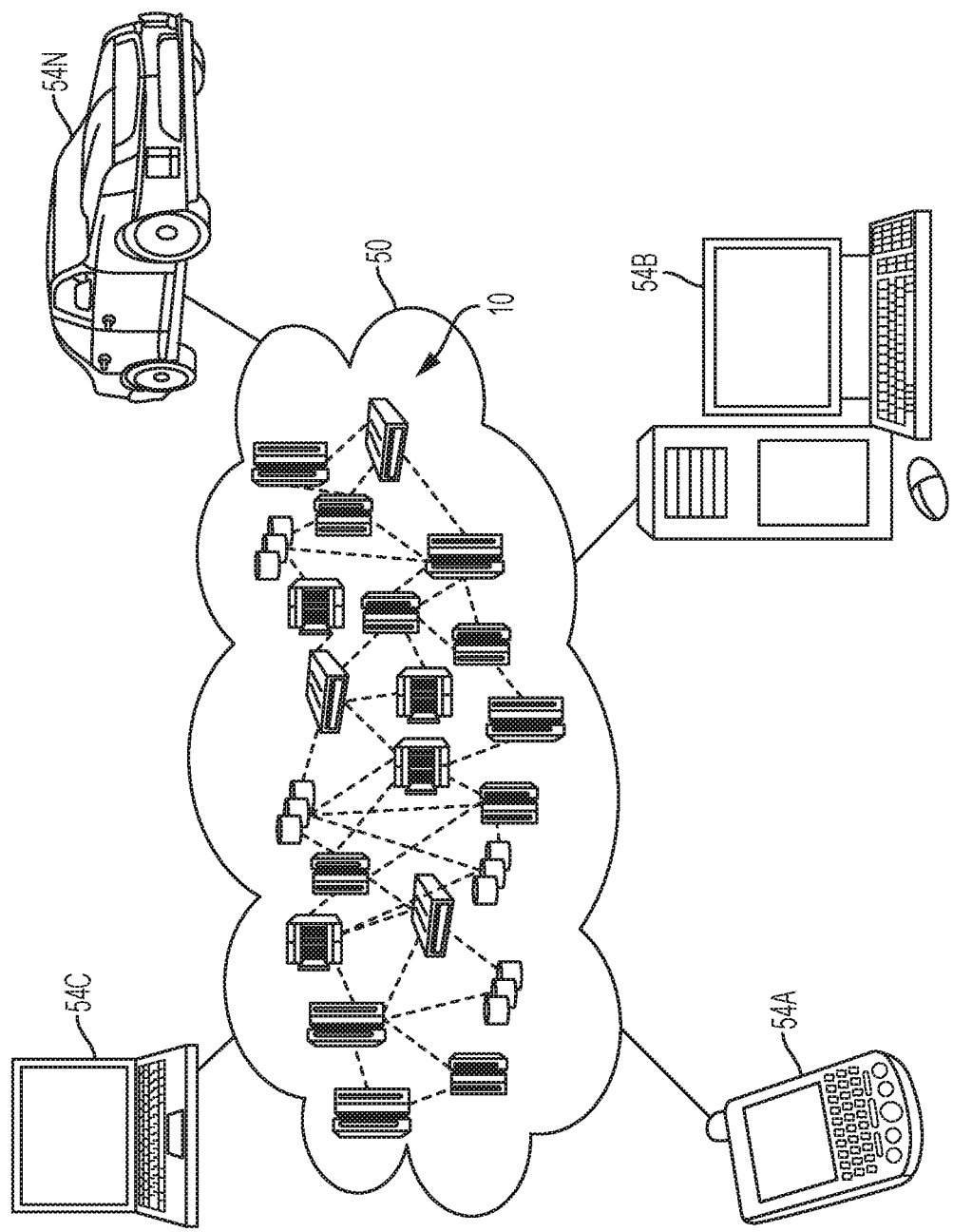
FIG. 8 illustrates a cloud computing environment, in accordance with embodiments of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 5 are intended to be illustrative only and that computing nodes 10 and cloud computing environment 50 can communicate with any type of computerized device over any type of network and/or network addressable connection (e.g., using a web browser).

Figure 9:
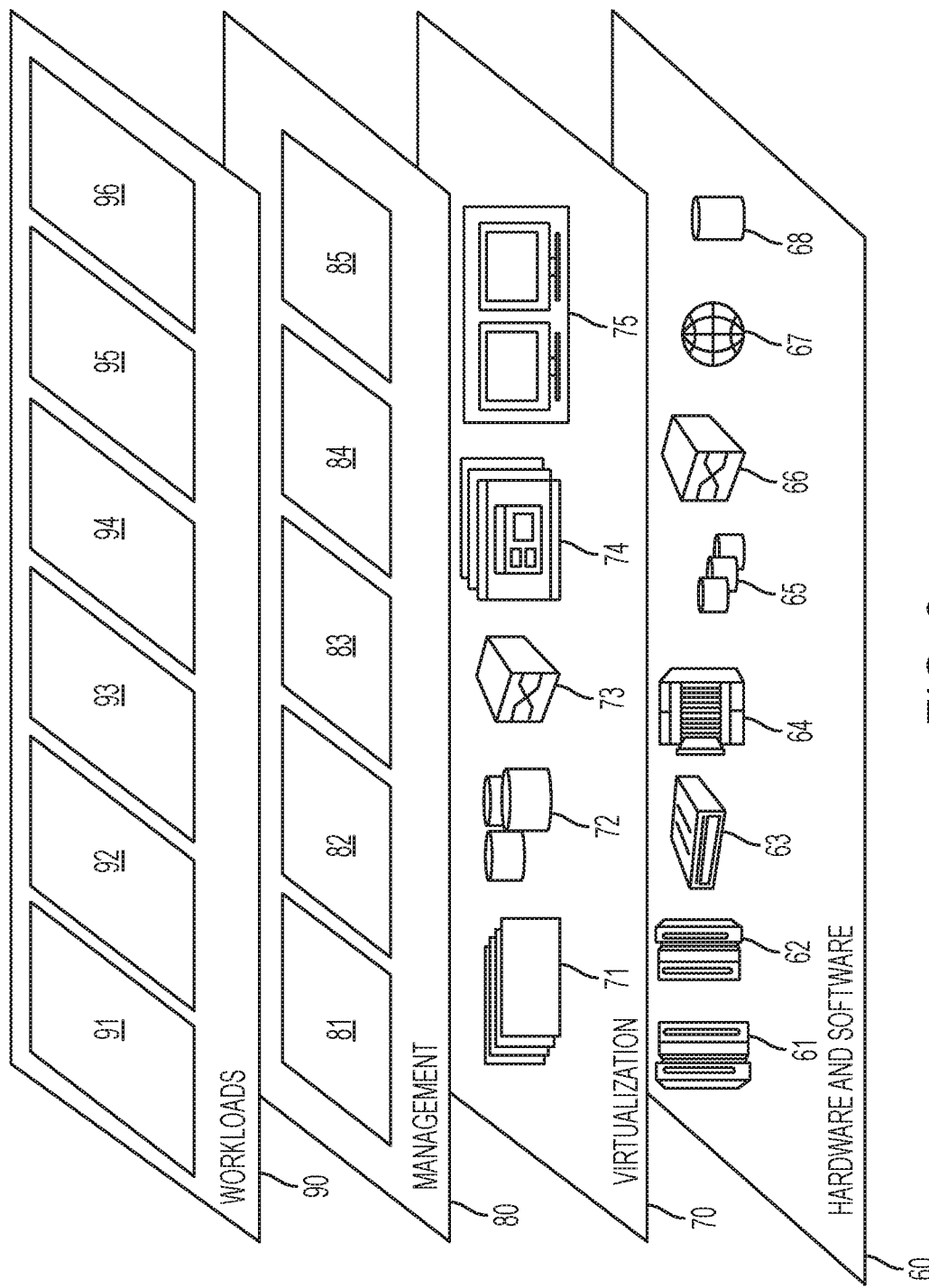
FIG. 9 illustrates a set of functional abstraction layers provided by cloud computing environment, in accordance with embodiments of the present invention.

Referring now to FIG. 9, a set of functional abstraction layers provided by cloud computing environment 50 (see FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 89 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and for improving virtual display technology associated with generating multiple video streams for preventing a visual obstruction with respect to visual presentations 6.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A virtual display generation improvement method comprising:
   generating, by a processor of a hardware device, configuration code associated with determining and resolving a physical obstruction with respect to a visual presentation;
   enabling, by said processor executing said configuration code, a first video retrieval device for retrieving a first video stream of a first object and a second object being viewed by a plurality of users;
   enabling, by said processor executing said configuration code, a second video retrieval device for retrieving a second video stream of said plurality of users;
   detecting, by said processor executing said configuration code with respect to said first video stream and said second video stream, a visual obstruction comprising a portion of said first object visually obstructing a portion of said second object with respect to at least one viewing angle of said plurality of users;
   determining in real time, by said processor executing said configuration code, a time period associated with said portion of said first object visually obstructing said portion of said second object with respect to said at least one viewing angle;

determining, by said processor executing said configuration code, a boundary associated with said portion of said second object being visually obstructed with respect to said at least one viewing angle;

determining, by said processor executing said configuration code, a content type of said portion of said second object being visually obstructed with respect to said at least one viewing angle;

analyzing, by said processor executing said configuration code, said time period, said boundary, and said content type with respect to a severity threshold value;

generating, by said processor executing said configuration code with respect to results of said analyzing, a video stream presenting an entire view of said second object without being visually obstructed with respect to said first object and said at least one viewing angle; and presenting, by said processor, said video stream.

2. The method of claim 1, wherein said generating said configuration code comprises:
defining a duration of obstruction threshold;
defining a percentage of content obstruction threshold;
defining a content type importance level;
defining a number of viewers threshold value;
generating a severity threshold value based on said duration of obstruction threshold, said content obstruction threshold, said content type importance level, and said number of viewers threshold; and
incorporating said severity threshold value within said configuration code.

3. The method of claim 1, wherein said generating said configuration code comprises:
defining a display means for presenting said video stream;
generating display code for enabling said display means; and
incorporating said display code within said configuration code.

4. The method of claim 1, wherein said generating said configuration code comprises:
retrieving, from a database, video data associated with previous physical obstructions with respect to previous visual presentations;
analyzing said video data;
generating obstruction prediction code based on results of said analyzing said video data; and
incorporating said obstruction prediction code within said configuration code.

5. The method of claim 1, further comprising:
determining, by said processor via a plurality of sensors, dimensions of an enclosure comprising said plurality of users and said visual presentation; and
analyzing, by said processor, said dimensions with respect to said at least one viewing angle, wherein said presenting is executed based on results of said analyzing said dimensions with respect to said at least one viewing angle.

6. The method of claim 1, wherein said generating said video stream comprises:
generating a hologram associated with said video stream.

7. The method of claim 6, wherein said presenting comprises:
projecting said hologram in front of said visual obstruction thereby generating a virtual surface for said projecting.

8. The method of claim 7, wherein said virtual surface comprises a surface selected form the group consisting of a single flat virtual surface, a single curved virtual surface, and a multisided projected virtual surface.

9. The method of claim 7, wherein a view of said first object and said second object is blocked, by said visual surface, from said plurality of users.

10. The method of claim 1, wherein said generating said video stream comprises:
generating a split screen view comprising a first video stream portion, of said video stream, comprising said first object and a second video stream portion, of said video stream, comprising said second object, wherein said first object comprises an instructor presenting on a surface comprised by said second object.

11. The method of claim 10, wherein said split screen view is presented via a display device.

12. The method of claim 1, wherein said generating said video stream comprises:
generating a visual image of said second object overlaying said first object.

13. The method of claim 1, wherein said generating said video stream comprises:
generating an overlay view comprising said portion of said second object being obstructed overlaying and said portion of said first object, wherein said overlay view is presented via a display device.

14. The method of claim 13, further comprising:
determining, by said processor via a plurality of sensors, dimensions of an enclosure comprising said plurality of users and said visual presentation; and
analyzing, by said processor, said dimensions with respect to said at least one viewing angle, wherein said generating said overlay view is executed based on results of said analyzing said dimensions with respect to said at least one viewing angle.

15. The method of claim 1, further comprising:
providing at least one support service for at least one of creating, integrating, hosting, maintaining, and deploying computer-readable code in the control hardware, said code being executed by the computer processor to implement: said generating said configuration code, said enabling said first video retrieval device, said enabling said second video retrieval device, said detecting, said determining said time period, said determining said boundary, said determining said content type, said analyzing, said generating said video stream, and said presenting.

16. A computer program product, comprising a computer readable hardware storage device storing a computer readable program code, said computer readable program code comprising an algorithm that when executed by a processor of a hardware device implements a virtual display generation improvement method, said method comprising:
generating, by said processor, configuration code associated with determining and resolving a physical obstruction with respect to a visual presentation;
enabling, by said processor executing said configuration code, a first video retrieval device for retrieving a first video stream of a first object and a second object being viewed by a plurality of users;
enabling, by said processor executing said configuration code, a second video retrieval device for retrieving a second video stream of said plurality of users;
detecting, by said processor executing said configuration code with respect to said first video stream and said second video stream, a visual obstruction comprising a portion of said first object visually obstructing a portion of said second object with respect to at least one viewing angle of said plurality of users;

determining in real time, by said processor executing said configuration code, a time period associated with said portion of said first object visually obstructing said portion of said second object with respect to said at least one viewing angle;

determining, by said processor executing said configuration code, a boundary associated with said portion of said second object being visually obstructed with respect to said at least one viewing angle;

determining, by said processor executing said configuration code, a content type of said portion of said second object being visually obstructed with respect to said at least one viewing angle;

analyzing, by said processor executing said configuration code, said time period, said boundary, and said content type with respect to a severity threshold value;

generating, by said processor executing said configuration code with respect to results of said analyzing, a video stream presenting an entire view of said second object without being visually obstructed with respect to said first object and said at least one viewing angle; and presenting, by said processor, said video stream.

17. The computer program product of claim 16, wherein said generating said configuration code comprises:

defining a duration of obstruction threshold;

defining a percentage of content obstruction threshold;

defining a content type importance level;

defining a number of viewers threshold value;

generating a severity threshold value based on said duration of obstruction threshold, said content obstruction threshold, said content type importance level, and said number of viewers threshold; and incorporating said severity threshold value within said configuration code.

18. The computer program product of claim 16, wherein said generating said configuration code comprises:

defining a display means for presenting said video stream;

generating display code for enabling said display means; and incorporating said display code within said configuration code.

19. The computer program product of claim 16, wherein said generating said configuration code comprises:

retrieving, from a database, video data associated with previous physical obstructions with respect to previous visual presentations;

analyzing said video data;

generating obstruction prediction code based on results of said analyzing said video data; and incorporating said obstruction prediction code within said configuration code.

20. A hardware device comprising a processor coupled to a computer-readable memory unit, said memory unit comprising instructions that when executed by the processor implements a virtual display generation improvement method comprising:

generating, by said processor, configuration code associated with determining and resolving a physical obstruction with respect to a visual presentation;

enabling, by said processor executing said configuration code, a first video retrieval device for retrieving a first video stream of a first object and a second object being viewed by a plurality of users;

enabling, by said processor executing said configuration code, a second video retrieval device for retrieving a second video stream of said plurality of users;

detecting, by said processor executing said configuration code with respect to said first video stream and said second video stream, a visual obstruction comprising a portion of said first object visually obstructing a portion of said second object with respect to at least one viewing angle of said plurality of users;

determining in real time, by said processor executing said configuration code, a time period associated with said portion of said first object visually obstructing said portion of said second object with respect to said at least one viewing angle;

determining, by said processor executing said configuration code, a boundary associated with said portion of said second object being visually obstructed with respect to said at least one viewing angle;

determining, by said processor executing said configuration code, a content type of said portion of said second object being visually obstructed with respect to said at least one viewing angle;

analyzing, by said processor executing said configuration code, said time period, said boundary, and said content type with respect to a severity threshold value;

generating, by said processor executing said configuration code with respect to results of said analyzing, a video stream presenting an entire view of said second object without being visually obstructed with respect to said first object and said at least one viewing angle; and presenting, by said processor, said video stream.

\* \* \* \* \*